United States Patent
Chen et al.

(10) Patent No.: US 10,959,097 B1
(45) Date of Patent: Mar. 23, 2021

(54) METHOD AND SYSTEM FOR ACCESSING PRIVATE NETWORK SERVICES

(71) Applicant: INDUSTRIAL TECHNOLOGY RESEARCH INSTITUTE, Hsinchu (TW)

(72) Inventors: Jian-Cheng Chen, Hsinchu (TW); Kuo-Wei Wen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/731,197

(22) Filed: Dec. 31, 2019

(30) Foreign Application Priority Data

Nov. 25, 2019 (TW) .................................. 108142736

(51) Int. Cl.
*H04M 1/66* (2006.01)
*H04W 12/06* (2021.01)
(Continued)

(52) U.S. Cl.
CPC .......... *H04W 12/06* (2013.01); *H04W 12/08* (2013.01); *H04W 36/0011* (2013.01); *H04W 36/12* (2013.01)

(58) Field of Classification Search
CPC combination set(s) only.
See application file for complete search history.

(56) References Cited

U.S. PATENT DOCUMENTS

| | | | |
|---|---|---|---|
| 2018/0270720 A1* | 9/2018 | Shi | H04W 36/26 |
| 2018/0270780 A1* | 9/2018 | Xiong | H04W 8/22 |

(Continued)

FOREIGN PATENT DOCUMENTS

| | | |
|---|---|---|
| CN | 107302762 | 10/2017 |
| CN | 109040312 | 12/2018 |
| TW | 201926956 | 7/2019 |

OTHER PUBLICATIONS

Opadere, et al. "Energy-efficient Virtual Radio Access Networks for Multi-Operators Cooperative Cellular Networks", IEEE Transactions on Green Communications and Networking; May 13, 2019; 1-12.

(Continued)

*Primary Examiner* — David Q Nguyen
(74) *Attorney, Agent, or Firm* — Amin, Turocy & Watson, LLP

(57) ABSTRACT

A method and a system for accessing private network services are disclosed. A second MEC platform receives a user service authentication process triggered by a first MEC platform based on a service access request issued by user equipment for accessing a second core network. In response to the user service authentication process, the second MEC platform preforms a user transition process to trigger the user equipment to perform an access authentication process of the second core network to verify identity information and radio network information of the user equipment. When the second MEC platform successfully verifies the identity information and the radio network information of the user equipment, the user equipment is allowed to be transited from the first MEC platform to the second MEC platform to access services of the second core network.

14 Claims, 8 Drawing Sheets

(51) Int. Cl.
  *H04W 12/08*  (2021.01)
  *H04W 36/00*  (2009.01)
  *H04W 36/12*  (2009.01)

(56) References Cited

U.S. PATENT DOCUMENTS

| | | | | |
|---|---|---|---|---|
| 2018/0359617 | A1* | 12/2018 | Duan | H04L 12/1403 |
| 2019/0007992 | A1 | 1/2019 | Kim et al. | |
| 2019/0042318 | A1 | 2/2019 | Ljung et al. | |
| 2019/0045409 | A1* | 2/2019 | Rasanen | H04W 88/16 |
| 2019/0059067 | A1 | 2/2019 | Lee et al. | |
| 2019/0098536 | A1 | 3/2019 | Qiao et al. | |
| 2019/0098537 | A1 | 3/2019 | Qiao et al. | |
| 2019/0116486 | A1 | 4/2019 | Kim et al. | |
| 2019/0141593 | A1* | 5/2019 | Wei | H04W 24/02 |
| 2019/0373516 | A1* | 12/2019 | Caldenhoven | H04W 36/08 |
| 2020/0196203 | A1* | 6/2020 | Yang | H04W 36/10 |
| 2020/0229038 | A1* | 7/2020 | Zhu | G06F 9/546 |
| 2020/0267518 | A1* | 8/2020 | Sabella | H04W 48/16 |
| 2020/0274942 | A1* | 8/2020 | Mueck | H04L 67/2804 |

OTHER PUBLICATIONS

Pencheva, et al. "Open Access to Intersystem Handover Control Using Multi-access Edge Computing", 2018 International Symposium on Networks, Computers and Communications(ISNCC); Nov. 12, 2018;1-7.

Ni, et al. "Efficient and Secure Service-Oriented Authentication Supporting Network Slicing for 5G-Enabled IoT", IEEE Journal on Selected Areas in Communications; Mar. 12, 2018; 644-657.

Husain, et al. "Mobile Edge Computing with Network Resource Slicing for Internet-of-Things", 2018 IEEE 4th World Forum on Internet of Things (WF-IoT); 2018.

Garcia-Perez, et al. "Enabling low latency services in standard LTE networks", 2016 IEEE 1st International Workshops on Foundations and Applications of Self-* Systems; 2017.

Lee, et al. "Local Breakout of Mobile Access Network Traffic by Mobile Edge Computing", Information and Communication Technology Convergence (ICTC), 2016 International Conference on; 2016.

Shojafar, et al. "Energy-Efficient Adaptive Resource Management for Real-Time Vehicular Cloud Services", 2016 IEEE 24th International Conference on Network Protocols (ICNP) Workshop on Hot Topics in Practical Networked Systems (HotPNS 2016); 2016.

Huang, et al. "Application-aware Traffic Redirection: A Mobile Edge Computing Implementation toward Future 5G Networks", 2017 IEEE 7th International Symposium on Cloud and Service Computing; 2017.

Schiller, et al. "CDS-MEC: NFV/SDV-based Application Management for MEC in 5G Systems", Computer Networks vol. 135, Apr. 22, 2018, pp. 96-107; 2018.

* cited by examiner

METHOD AND SYSTEM FOR ACCESSING PRIVATE NETWORK SERVICES

CROSS-REFERENCE TO RELATED APPLICATIONS

This application claims priority to Taiwanese Application Serial No. 108142736, filed on Nov. 25, 2019. The entirety of the above-mentioned patent application is hereby incorporated by reference herein and made a part of this specification.

BACKGROUND

1. Technical Field

The present disclosure relates to methods and systems for accessing network services, and, more particularly, to a method and a system that are applicable to mobile edge computing (MEC) for accessing private network services.

2. Description of Related Art

International Telecommunication Union Radio Communication Sector (ITU-R) requires the fifth generation (5G) communication to have features of low latency, high capacity and more consistent experience.

For the low latency, the 5G White Paper of the Next Generation Mobile Network (NGMN) association and the 5G Vision of the 5G Infrastructure Public Private Partnership (5G PPP) mention that the End-to-End Latency is about 5 ms-10 ms and the over-the-air latency is about 1 ms. Traditionally, the services on the network are placed in a data center. For example, if services are placed in a data center of Amazon Web Service (AWS) in Seattle, Wash., users in Taiwan have to meet the required End-to-End Latency of 5 ms-10 ms when accessing the services, which is very difficult, since Seattle, Wash. is far away from Taiwan at a distance about 9852 km, which takes 65.68 ms for light to travel back and forth.

A novel network architecture, "mobile edge computing (MEC)," is proposed, which provides cloud computing and storage at the edge of a mobile network, thereby providing a service environment of low latency and high capacity and processing or bypassing at a local end that a data flow should flow to a core network end originally. However, the operation mechanism of the existing MEC platform supports accessing a mobile network operator (MNO), and does not allow the terminal devices of different MNOs to access the application services of MEC. Accordingly, when an enterprise provides dedicated 5G application services at MEC of one MNO, the existing MEC platform cannot provide the users of different MNO to use the services.

Therefore, how to provide a system and a method that assist users to access dedicated 5G application services and allow users of different MNOs to use the services is becoming an urgent issue in the art.

SUMMARY

In an embodiment, a method for accessing private network services is provided, which is applicable to mobile edge computing (MEC) and comprises: a second MEC platform receiving a user service authentication process triggered by a first MEC platform based on a service access request issued by user equipment for accessing a second core network, wherein a first core network includes the first MEC platform and the second core network includes the second MEC platform; in response to the user service authentication process, the second MEC platform preforming a user transition process to trigger the user equipment to perform an access authentication process of the second core network to verify identity information and radio network information of the user equipment; and when the second MEC platform successfully verifies the identity information and the radio network information of the user equipment, allowing the user equipment to be transited from the first MEC platform to the second MEC platform to access services of the second core network.

In another embodiment, a system for accessing private network services is provided, which is applicable to mobile edge computing (MEC) and comprises: a first MEC platform including a first authentication server, wherein a first core network includes the first MEC platform; and a second MEC platform including a second authentication server, wherein a second core network includes the second MEC platform, wherein the second authentication server receives a user service authentication process triggered by the first authentication server based on a service access request issued by user equipment for accessing the second core network, wherein in response to the user service authentication process, the second MEC platform preforms a user transition process to trigger the user equipment to perform an access authentication process of the second core network through the first authentication server to verify identity information and radio network information of the user equipment, and wherein when the second MEC platform successfully verifies the identity information and the radio network information of the user equipment, the user equipment is allowed to be transited from the first MEC platform to the second MEC platform to access services of the second core network.

DETAILED DESCRIPTION

Figure 1:
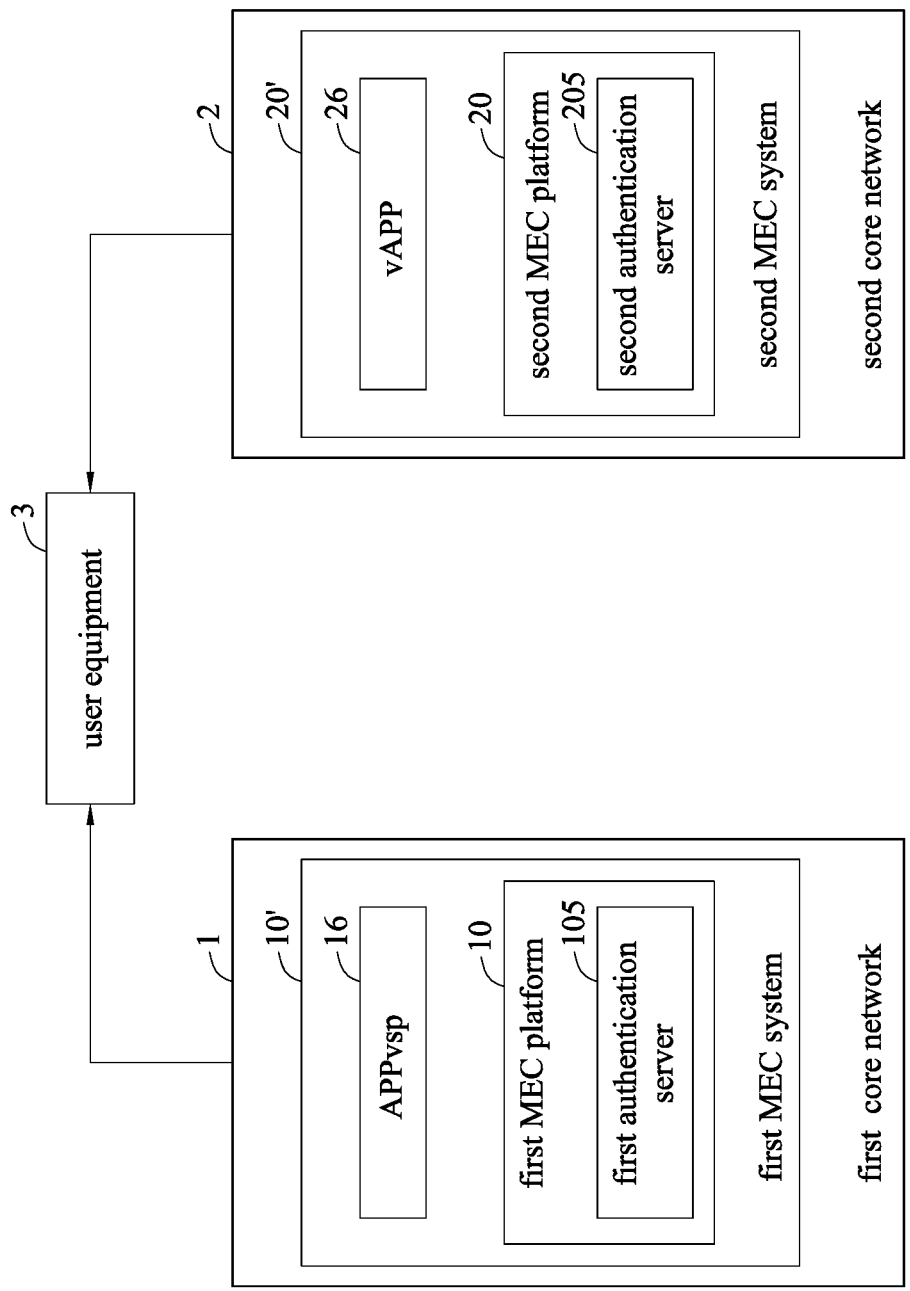
FIG. 1 is a functional block diagram of a system for accessing private network services of an embodiment according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Refer to FIG. 1. A system for accessing private network services of an embodiment according to the present disclosure comprises a first MEC platform 10 and a second MEC platform 20. A first core network 1 includes the first MEC platform 10. A second core network 2 includes the second MEC platform 20. A first MEC system 10' includes the first MEC platform 10. A second MEC system 20' includes the second MEC platform 20. In an embodiment, user equipment 3 belongs to the first core network 1, which could normally access a first MEC application. The second core network 2 is able to seem like a private network for the user equipment 3.

In order to allow user equipment to actively execute a user service authentication request to a private network in the existing mobile network environment, in an embodiment according to the present disclosure a certain portal webpage or a certain portal application is used to trigger and execute a service access request and user service authentication. In an embodiment, the second MEC platform 20 provides to the first MEC platform 10 a launching registration request of an application (APPvsp) 16 that can authenticate services of a private network. In the request, the second MEC platform 20 transmits to the first MEC platform 10 an image file of the APPvsp 16, an address in which the APPvsp 16 is stored, and an authentication protocol for executing user service authentication, to launch the APPvsp 16 on the first MEC platform 10. In an embodiment, the authentication protocol includes the identity (ID) of the second MEC platform 20. The authentication protocol further includes an account and a password of the user equipment, a public key required for authentication, or tokens required for service authentication, such as special passwords.

In an embodiment, the user equipment 3 issues through the portal webpage or the portal application to the first core network 1 accessed a service access request for accessing the second core network 2, to allow the second authentication server 205 of the second MEC platform 20 to receive a user service authentication process triggered by the first authentication server 105 of the first MEC platform 10 based on the service access request issued by the user equipment 3, and the second MEC platform 20 performs a user transition process in response to the user service authentication process to trigger the user equipment 3 to execute an access authentication process of the second core network 2 to verify identity information and radio network information of the user equipment 3. When the second MEC platform 20 successfully verifies the identity information and the radio network information of the user equipment 3, the user equipment 3 is allowed to be transited from the first MEC platform 10 to the second MEC platform 20 to access services of the second core network 2. In an embodiment, the first MEC platform 10 obtains from the first core network 1 identity information of the user equipment 3, such as subscription permanent identifier (SUPI) and radio network information of the user equipment 3, such as reference signal received power (RSRP) and reference signal received quality (RSRQ) of neighboring cells, to determine the position information and signal quality of the user equipment 3. In the following, the identity information and the radio network information are collectively to be called "user radio access states," and are transmitted through the first MEC platform 10 and the second MEC platform 20 to the second core network 2. In an embodiment, the second MEC platform 20 responds to the first MEC platform 10 whether the user equipment 3 is authenticated successfully.

The second MEC platform 20 establishes an authentication rule in the second core network 2 based on the identity information. The second MEC platform 20 updates the access right of the user equipment 3 (e.g., a policy and charging control rule or PCC Rule) to the second core network 2. The second MEC platform 20 notifies the first MEC platform 10 to perform a user transition process to trigger the user equipment 3 to perform a network selection. The user equipment 3 will release the session of the first core network 10, and issue a request of establishing a session process to the second core network 2.

After the second core network 2 identifies the access right of the user equipment 3 and examines the access authentication of the user equipment 3 to the first core network 1, the user equipment 3 is allowed to establish a session process to the second core network 2 based on the authentication rule, to access services of the private application (vAPP) 26 of the second MEC system 20'.

If the user equipment 3 is to cancel the services of the second core network 2, the second MEC platform 20 performs an access handover, and the second MEC platform 20 updates the access right of the user equipment 3 to the second core network 2, triggers the user equipment 3 to be released from the session process from the second core network 2, and establishes a session process to the first core network 1.

Figure 2A:
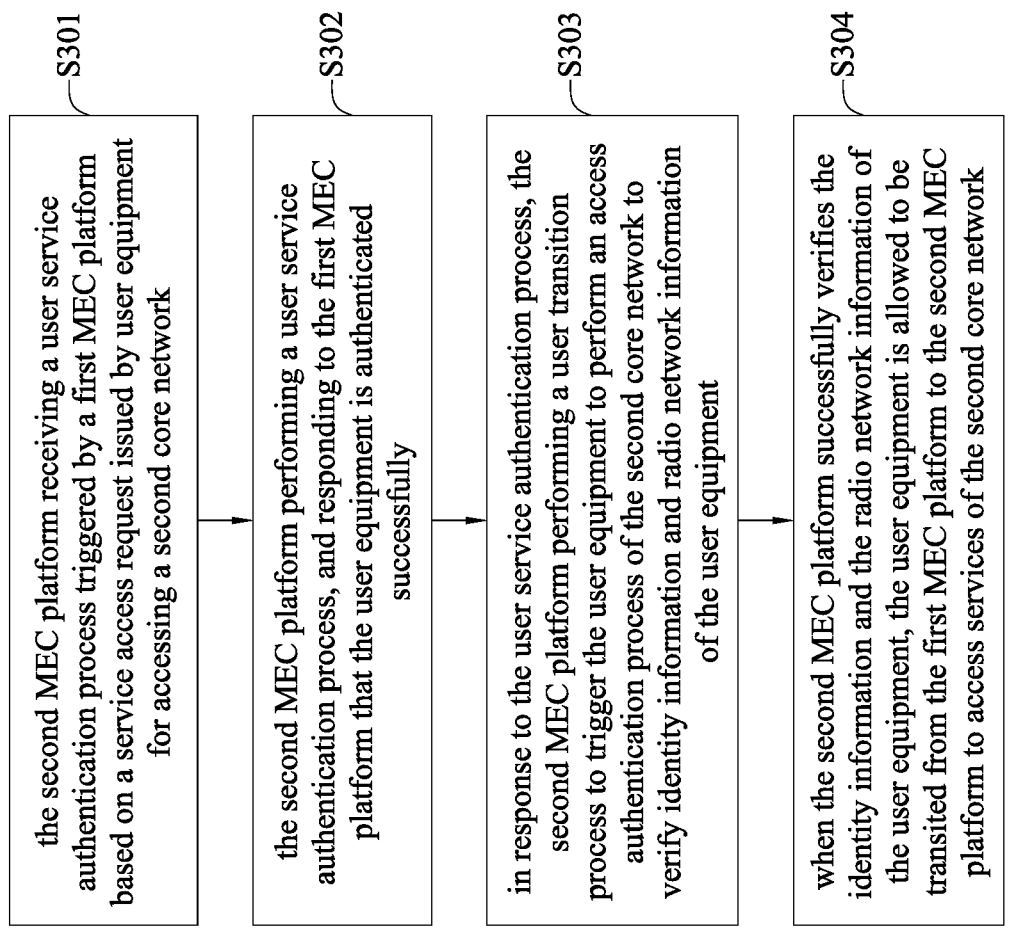
FIGS. 2A and 2B are flow charts illustrating a method for accessing private network services of an embodiment according to the present disclosure.
Figure 2B:
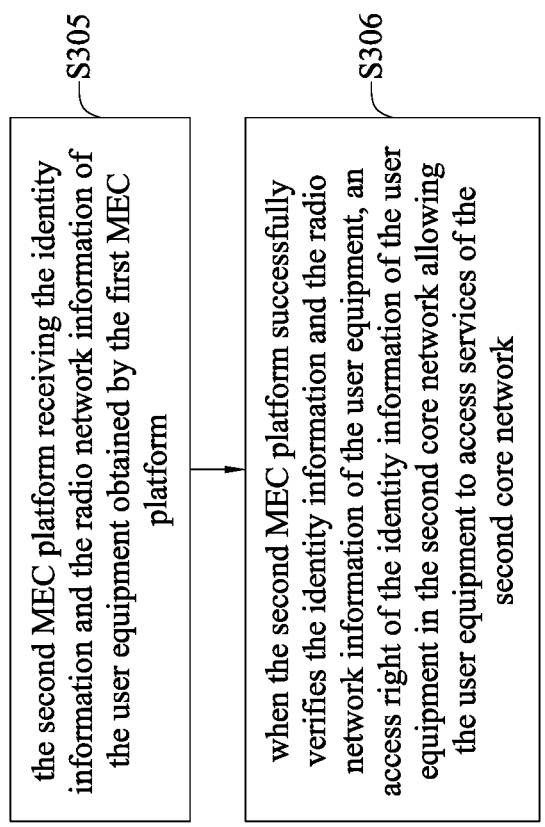

Refer to FIGS. 2A and 2B. A method for accessing private network services of an embodiment according to the present disclosure comprises steps S301 to S304. In step S301, the second MEC platform receives a user service authentication process triggered by a first MEC platform based on a service access request issued by user equipment for accessing a second core network. In step S302, the second MEC platform performs a user service authentication process, and responds to the first MEC platform that the user equipment is authenticated successfully. In step S303, in response to the user service authentication process, the second MEC platform performs a user transition process to trigger the user equipment to perform an access authentication process of the second core network to verify identity information (e.g., SUPI) and radio network information (e.g., neighboring cells, such as rsrp/rsrq) of the user equipment. In step S304, when the second MEC platform successfully verifies the identity information and the radio network information of the user equipment, the user equipment is allowed to be transited from the first MEC platform to the second MEC platform to access services of the second core network.

In an embodiment, the second MEC platform transmits to the first MEC platform an image file of an application, an address in which the application is stored, and an authentication protocol for executing the user service authentication, to launch the application in the first MEC system. The authentication protocol includes the identity of the second MEC platform. The first MEC system includes the first MEC platform.

In an embodiment, referring to steps S305 and S306, the user transition process includes the second MEC platform receiving the identity information and the radio network information of the user equipment obtained by the first MEC platform (step S305). When the second MEC platform successfully verifies the identity information and the radio network information of the user equipment, an access right of the identity information of the user equipment in the second core network allows the user equipment to access services of the second core network (step S306).

In an embodiment, the first MEC platform obtains from the first core network the identity information and the radio network information of the user equipment and transmits the identity information and the radio network information of the user equipment to the second MEC platform. In another embodiment, the second MEC platform updates the access right of the user equipment to the second core network based on the identity information and the radio network information of the user equipment, and establishes an authentication rule in the second core network based on the identity information. In an embodiment, the authentication rule is newly added to a UE route selection policy (URSP) in a policy control function (PCF) of a core network—non-public network access policy, and comprises a user identity and an access right. When the access and mobile management function (AMF) determines that the user identity does not belong to the second core network, a URSP user access rule is performed to check whether the user equipment has the right to perform the non-public network access policy. The policy first performs the access authentication based on the identity of the user equipment, and then the user equipment is accessed to the second MEC system, to complete the access of the user equipment to the second core network. In an embodiment, the second MEC platform notifies the first MEC platform to perform a user transition process to trigger the user equipment to perform a network selection. After receiving the service access request of the user equipment, the second core network identifies the access right, and establishes a session process of the user equipment based on the authentication rule. In an embodiment, the user transition process comprises triggering the user equipment to perform an access authentication process. In another embodiment, the access authentication process is executed by the system actively or by the user equipment manually.

Figure 3:
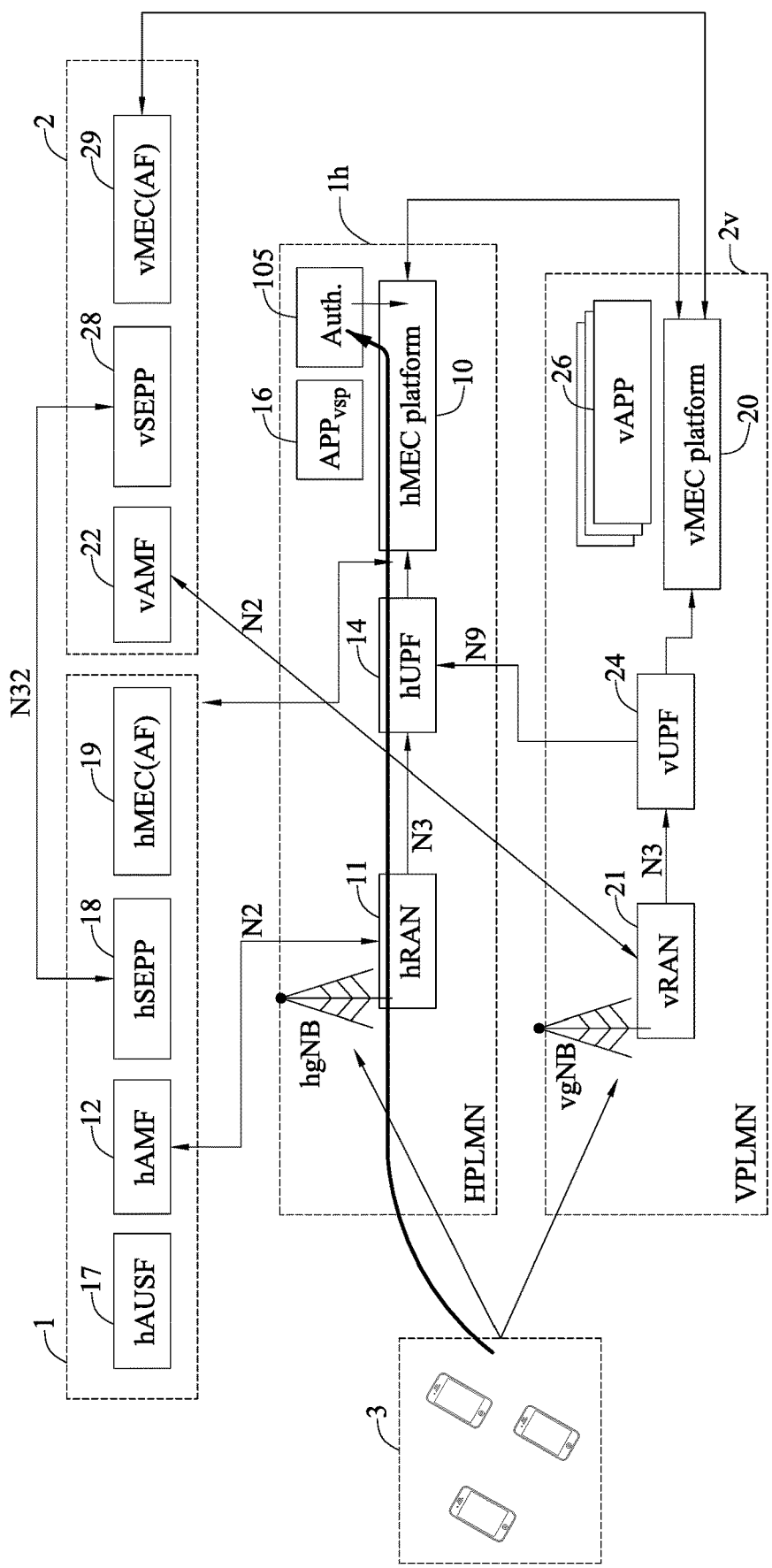
FIG. 3 schematically illustrating a system for accessing private network services of an embodiment according to the present disclosure.
Figure 4:
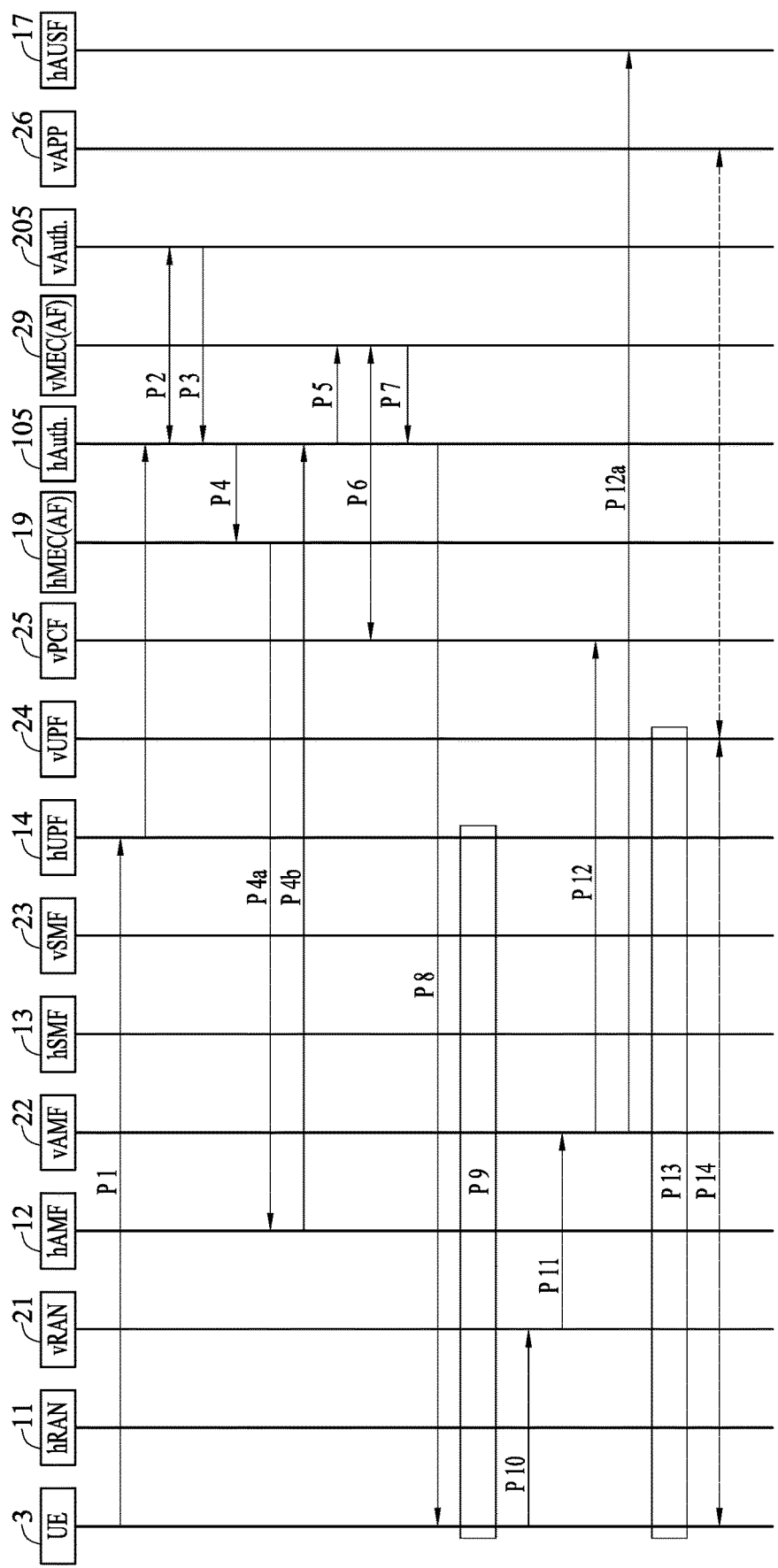
FIG. 4 schematically illustrating a method for accessing private network services of an embodiment according to the present disclosure.
Figure 5:
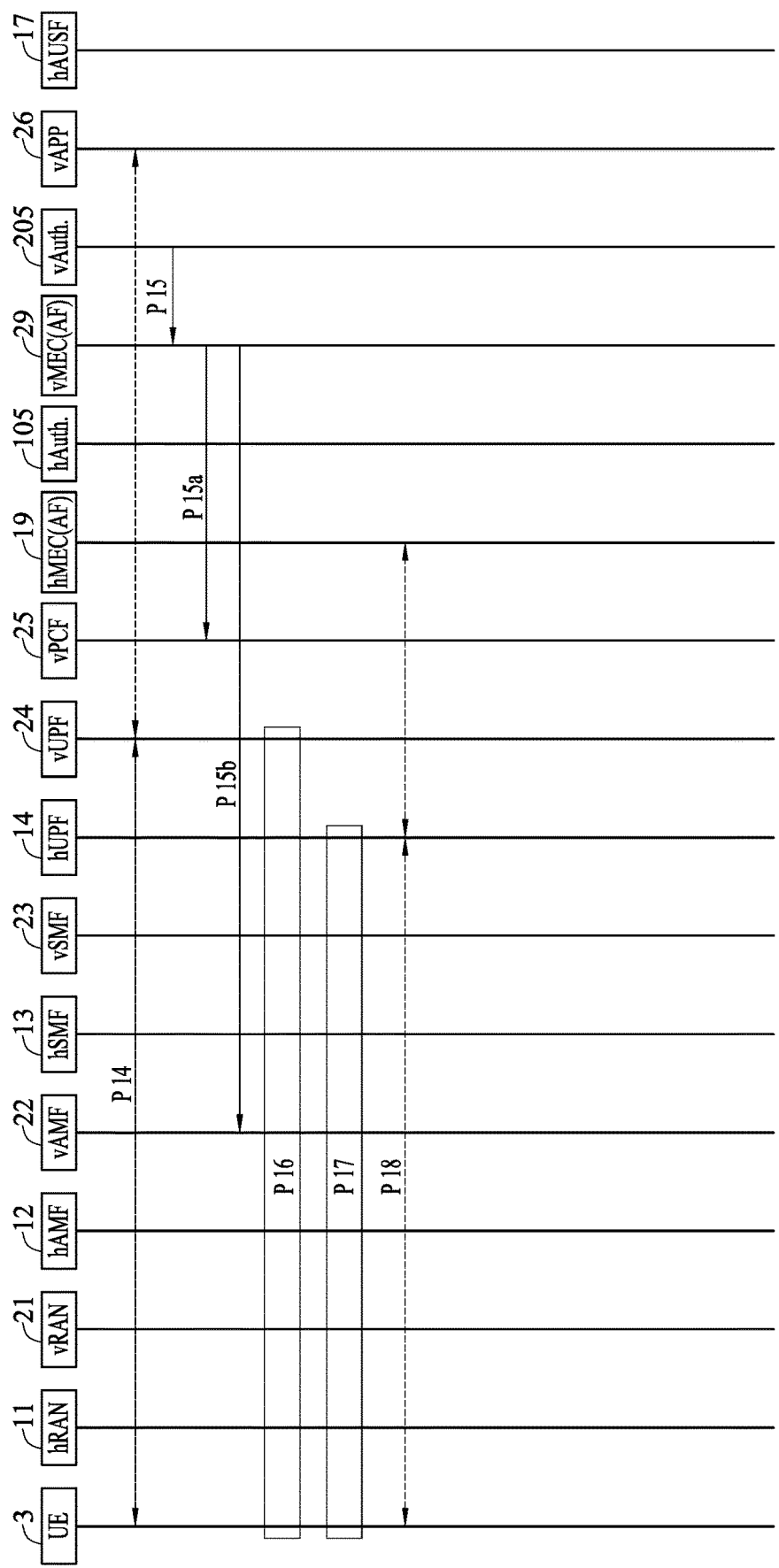
FIG. 5 schematically illustrating a method for accessing private network services of another embodiment according to the present disclosure.

FIGS. 3 to 5 illustrate a system and a method for accessing private network services of an embodiment according to the present disclosure.

In an embodiment, the network function (NF) has a 5G system architecture, and includes a radio access network (RAN), a user plane function (UPF), an authentication servers function (AUSF), an access and mobile management function (AMF), a session management function (SMF), a security edge protection proxy (SEPP), a policy control function (PCF), and an application function (AF). In an embodiment, the MEC system registers an application function (AF) in a 5G system for coordinating information between the core network and the MEC platform. In the embodiment shown in FIG. 3, the hAMF 12 and the hRAN 11 are communicatively connected via an N2 interface, the vAMF 22 and the vRAN 21 are communicatively connected via an N2 interface, the hRAN 11 and the hUPF 14 are communicatively connected via the N3 interface, the vRAN 21 and the vUPF 24 are communicatively connected via the N3 interface, and the hSEPP 18 and the vSEPP 28 are communicatively connected via an N32 interface. When the N32 interface is established, the hUPF 14 of the first core network 1 and the vUPF 24 of the second core network 2 are communicatively connected via an N9 interface.

As shown in FIGS. 3 to 5, the first core network 1 and the second core network 2 include their own respective network functions, which are marked by h and v, respectively. In an embodiment, the first core network 1 includes a first radio access network (hRAN) 11, a first access and mobile management function (hAMF) 12, a first session management function (hSMF) 13, a first user plane function (hUPF) 14, a first authentication servers function (hAUSF) 17, a first security edge protection proxy (hSEPP) 18 and a first MEC application coordination function (hMEC [AF]) 19. The second core network 2 includes a second radio access network (vRAN) 21, a second access and mobile management function (vAMF) 22, a second session management function (vSMF) 23, a second user plane function (vUPF) 24, a second policy control function (vPCF) 25, a second security edge protection proxy (vSEPP) 28 and a second MEC application coordination function (vMEC [AF]) 29.

In general, wireless communication networks constructed by operators are called public land mobile networks (PLMNs). Different operators can construct their own PLMNs. The PLMNs constructed by operators who contract with users are called the dedicated networks of the users, and are generally represented by home PLMNs (HPLMNs). The PLMNs constructed by operators who do not contract with users are called visited PLMNs (VPLMNs). As shown in the embodiment of FIG. 3, the first cells hgNB, the first MEC platform (or called hMEC platform) 10, the hRAN 11 and the hUPF 14 can be included in the HPLMN 1h, and the second cells vgNB, the second MEC platform (or called vMEC platform) 20, the vRAN 21 and the vUPF 24 can be included in the VPLMN 2v. The first MEC platform (or called hMEC platform) 10 further comprises a first authentication server (Auth.) 105 helping authenticating users. In an embodiment, the application (APPvsp) 16 is an authentication service portal program of the private application (vAPP) 26 according to an embodiment of the present disclosure.

In an embodiment, steps P1-P5 of FIG. 4 show an authentication process of the user equipment (UE) 3. Also refer to FIG. 3. In step P1, the UE 3 accesses a first authentication server (Auth.) 105 of the first MEC platform 10 through the hUPF 14 of the first core network 1, and the UE 3 issues to the first authentication server (Auth.) 105 of the first MEC platform 10 a service access request for accessing the second core network 2. In step P2, the second authentication server (Auth.) 205 of the second MEC platform 20 receives a user service authentication process triggered by the first authentication server (Auth.) 105 of the first MEC platform 10 based on a service access request issued by the UE 3 for accessing the second core network 2. In step P3, the second authentication server (Auth.) 205 of the second MEC platform 20 responds to the first authentication server (Auth.) 105 of the first MEC platform 10 that users are identified successfully. In response to the user service authentication process, the second MEC platform 20 executes a user transition process to trigger the UE 3 to execute an access authentication process of the second core network 2, which will be described in the following paragraphs. In step P4, the first authentication server (Auth.) 105 of the first MEC platform 10 obtains from the hMEC (AF) 19 of the first core network 1 session states of the UE 3, for use in an access authentication process to be executed. In step P4a, the hMEC (AF) 19 transmits the identity information subscription permanent identifier (SUPI) of the UE 3 to the hAMF 12 of the first core network 1. In step P4b, the hAMF 12 transmits to the first authentication server (Auth.) 105 a 5G position information request, a current position request and radio network information such as signal state information of the UE 3. In step P5, the first authentication server (Auth.) 105 reports to the vMEC (AF) 29 of the second core network 2 the state information of the UE 3, such as identity information (SUPI), position information, signal information of neighboring cells (rsrp/rsrq), etc.

In an embodiment, as shown in steps P6-P14 of FIG. 4, the transit access process of the UE 3 is described. Also refer to FIG. 3. In step P6, an authentication rule is established in the second core network 2 based on identity information. The second MEC platform 20 establishes an authentication rule in the second core network 2 based on the identity information of the UE 3. The second MEC platform 20 updates the access right of the user equipment 3 (e.g., the policy and charging control rule [PCC Rule]) through the vMEC (AF) 29 to the vPCF 25 of the second core network 2. In step P7, the vMEC (AF) 29 of the second core network 2 triggers the first authentication server (Auth.) 105 of the first core network 1 to execute the access authentication process of the UE 3. In step P8, the first authentication server (Auth.) 105 of the first core network 1 triggers the application in the UE 3 to perform manual network selection to select vPLMN. In step P9, the UE 3 executes a session release process with the hUPF 14 of the first core network 1. In step P10, the UE 3 performs the manual selection network to the vRAN 21. In step P11, the vRAN 21 transmits to the vAMF 22 the service access request of the UE 3. In step P12, the vAMF 22 identifies the access right of the UE 3 to the vPCF 25 based on the service access request of the UE 3. In step P12a, the vAMF 22 of the second core network 2 examines that the access authentication of the UE 3 is successful to the hAUSF 17 of the first core network 1. In step P13, the UE 3 and the vUPF 24 of the second core network 2 execute a session establishment process based on the authentication rule. In step P14, the UE 3, through the vUPF 24, accesses services of the private application vAPP 26. When the second MEC platform 20 successfully verifies the identity information and the radio network information of the UE 3, the UE 3 is allowed to be transited from the first MEC platform 10 to the second MEC platform 20 to access services.

Steps P15-P18 shown in FIG. 5 illustrate the UE 3 accessing back to the default first core network 1 from the second core network 2. In step P15, the second authentication server (Auth.) 205 performs the access handover of the UE 3 to the vMEC (AF) 29. In step P15a, the vMEC (AF) 29 updates the access right of the UE 3 to the vPCF 25. In step P15b, the vMEC (AF) 29 notifies vAMF 22 that the UE 3 is going to release bearer. In step P16, the vAMF 22 releases UE's corresponding sessions from the vUPF 24. In step P17, the UE 3 and the hUPF 14 execute an establishment session process. In step P18, the UE 3 accesses the hMEC (AF) 19 through the hUPF 14.

Figure 6:
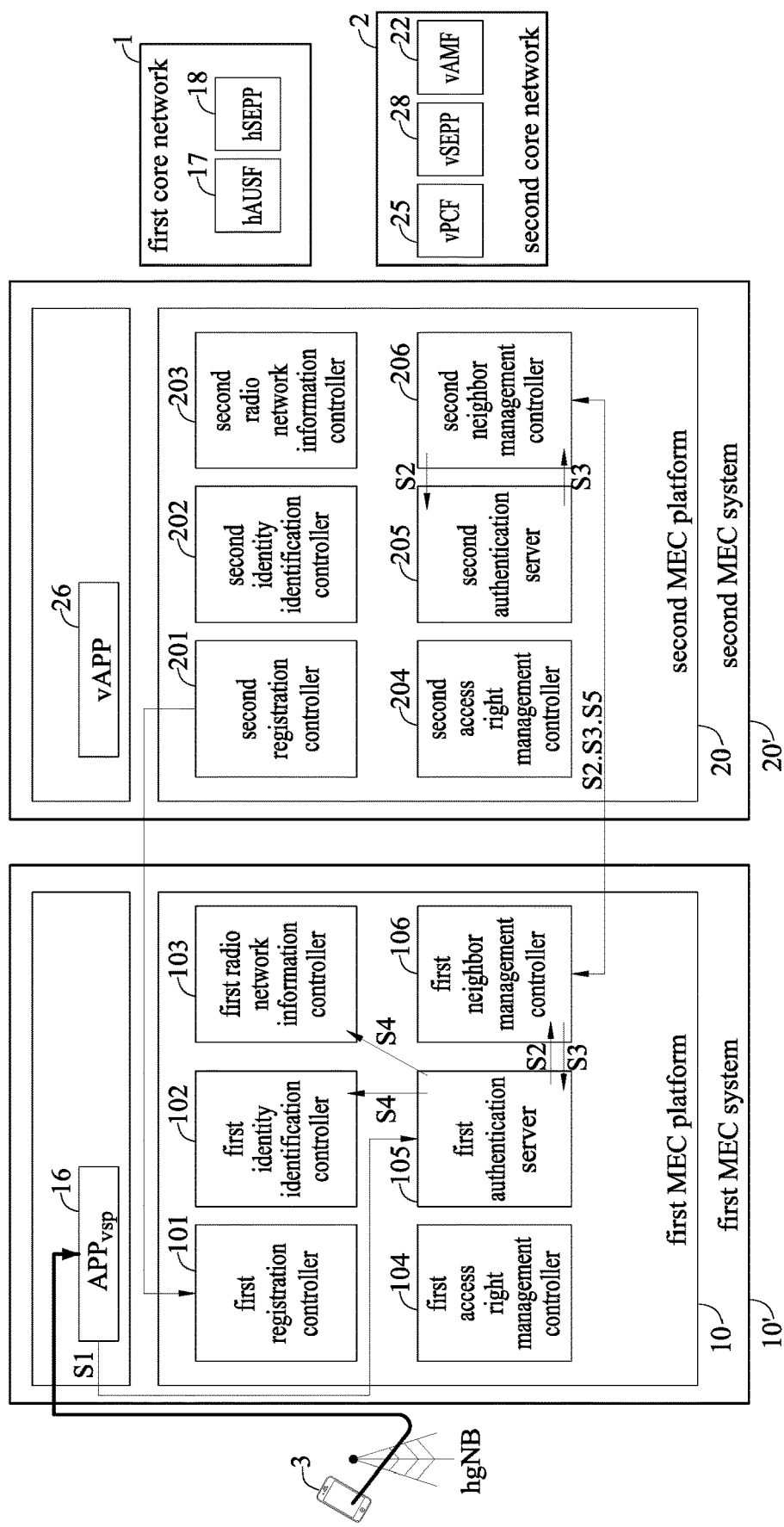
FIG. 6 schematically illustrating a system for accessing private network services of another embodiment according to the present disclosure.

Refer to FIG. 6, which illustrates launching services and authenticating user equipment of a system and a method for accessing private network services of an embodiment according to the present disclosure. The second registration controller 201 of the second MEC platform 20 issues a request of launching services of the application (APPvsp) 16 to the first registration controller 101 of the first MEC platform 10. In an embodiment, the second registration controller 201 transmits to the first registration controller 101 an image file of the APPvsp 16, an address in which the APPvsp 16 is stored, and an authentication protocol for executing the user service authentication, to launch the APPvsp 16 in the first MEC system 10'. The authentication protocol includes the identity (ID) of the second MEC platform 20. In an embodiment, the user equipment 3 issues the service access request through the APPvsp 16, and the APPvsp 16 triggers the access authentication process through the first authentication server 105.

In step S1, the UE 3 actuates the APPvsp 16 to be connected to the first MEC platform 10 to issue the user service authentication process to the first authentication server 105. In steps S2-S5, with the help of the first neighbor management controller 106 and the second neighbor management controller 206, the first authentication server 105 of the first MEC platform 10 and the second authentication server 205 of the second MEC platform 20 perform an authentication process, with tokens required in the authentication process, such as a string of 16 letters and numbers. In step S3, through the second neighbor management controller 206, the second authentication server 205 responds to the first authentication server 105 that the user authentication is successful. In step S4, the first identity identification controller 102 obtains from the first core network 1 a user right and the identity information, such as UE Info (e.g., SUPI) of the user equipment in 5GS, and provides the user right and the identity information to the first authentication server 105. The first radio network information controller 103 obtains from the first core network 1 the radio network information, such as the current radio information and signals of surrounding RAN of the user equipment, and provides the radio network information to the first authentication server 105. In step S5, the first MEC platform 10 transmits the identity information (UE Info) to the second authentication server 205 of the second MEC platform 20. In an embodiment, the first MEC platform 10 transmits the radio network information to the second MEC platform 20 for determining triggering the user transition process, for the second radio network information controller 203 to compare radio signals. When accessing the first core network 1 or the second core network 2, the UE 3 can use the SUPI to register network services to the first core network 1 or the second core network 2, and the first core network 1 or the second core network 2 can determine the network use right of the UE 3 based on the SUPI, thereby establishing the network services of the UE 3. In an embodiment, the user right means the access network right of the UE 3 in the first core network 1, which is maintained and set by the first core network 1. A right established in the second core network based on the user right is called an access right, which is used in a policy and charging control (PCC) rule in a newly added PCF and is maintained and set by the second MEC platform 20.

Figure 7:
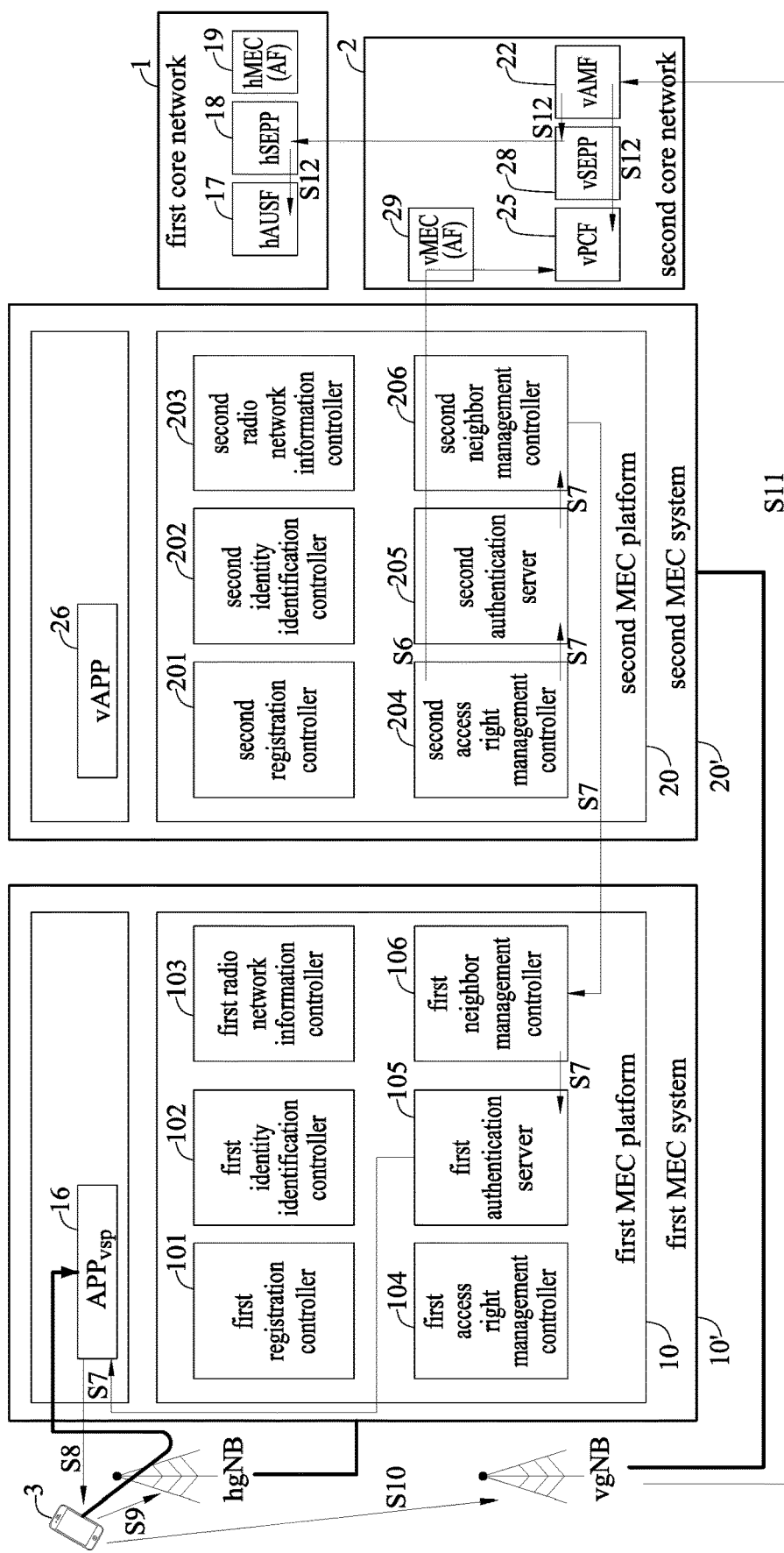
FIG. 7 schematically illustrating a system for accessing private network services of yet another embodiment according to the present disclosure.

FIG. 7 illustrates an access transition process of user equipment of a system and a method for accessing private network services of an embodiment according to the present disclosure. The second access right management controller 204 triggers the access authentication process of the UE 3. In step S6, when the second MEC platform 2 successfully verifies the identity information and the user right of the UE 3, an access right of the identity information of the UE 3 is established in the second core network 2 and stored in the second identity identification controller 202. The second access right management controller 204 updates the access right of the UE 3 through the vMEC (AF) 29 based on the identity information (e.g., SUPI) and the radio network information of the UE 3 to the vPCF 25 of the second core network 2, and establishes an authentication rule in the second core network 2 based on the identity information. The PCF rule of the second access right management controller 204 used in the second core network 2 is updated and used. The second MEC platform 20 writes the identity information and the authentication rule into the second core network 2. In an embodiment, through the user radio access states obtained by the first radio network information controller 103 and the second radio network information controller 203, the UE 3 is allowed to access services of the second core network 2.

In step S7, the second access right management controller 204 notifies through the second authentication server 205, the second neighbor management controller 206, the first neighbor management controller 106 and the first authentication server 105 the APPvsp 16 to trigger the UE 3 to perform manual network selection. In step S8, the APPvsp 16 performs manual network selection to the UE 3. In step S9, the UE 3 issues a release bearer request to the first cells hgNB. In step S10, the UE 3 issues a service access request to the second cells vgNB. In step S11, the second cells vgNB transmits the service access request of the UE 3 to the vAMF 22. In step S12, the vAMF 22 identifies the access right of the UE 3 to the vPCF 25 and examines the access authentication of the UE 3 to the hAUSF 17. Based on the authentication rule, the UE 3 and the vUPF 24 of the second core network 2 execute session establishment to complete the access authentication.

In the method and the system for accessing private network services according to the present disclosure, the MEC platform of the public network assists the user equipment (UE) to access services of private dedicated MEC platform, and the MEC platform verifies the identity and access right rule of the user equipment, to allow the user equipment, which accesses the public network originally, to access the private dedicated MEC platform.

It will be apparent to those skilled in the art that various modifications and variations can be made to the disclosed embodiments. It is intended that the specification and examples be considered as exemplary, with a true scope of the present disclosure being indicated by the following claims and their equivalents.

What is claimed is:

1. A method for accessing private network services, the method being applicable to mobile edge computing (MEC) and comprising:
  a second MEC platform receiving a user service authentication process triggered by a first MEC platform based on a service access request issued by user equipment for accessing a second core network, wherein a first core network includes the first MEC platform and the second core network includes the second MEC platform;
  in response to the user service authentication process, the second MEC platform preforming a user transition process to trigger the user equipment to perform an access authentication process of the second core network to verify identity information and radio network information of the user equipment;
  when the second MEC platform successfully verifies the identity information and the radio network information of the user equipment, allowing the user equipment to be transited from the first MEC platform to the second MEC platform to access services of the second core network;
  wherein the first MEC platform obtains a user right, the identity information and the radio network information from the first core network, and the first MEC platform provides the radio network information to the second MEC platform for determining triggering the user transition process and allowing a second radio network information controller of the second MEC platform to compare radio signals.

2. The method of claim 1, further comprising the second MEC platform transmitting an image file of an application to the first MEC platform, an address stored the application, and an authentication protocol for executing the user service authentication process, to launch the application in a first MEC system, wherein the authentication protocol includes identity of the second MEC platform, and the first MEC system includes the first MEC platform.

3. The method of claim 1, wherein the user transition process comprises the second MEC platform receiving the identity information and the radio network information of the user equipment obtained by the first MEC platform, and when the second MEC platform successfully verifies the identity information and the radio network information of the user equipment, establishing an access right of the identity information of the user equipment in the second core network to allow the user equipment to access services of the second core network.

4. The method of claim 3, wherein the first MEC platform transmits the identity information and the radio network information of the user equipment obtained from the first core network to the second MEC platform, and the second MEC platform updates the access right of the user equipment to the second core network based on the identity information and the radio network information of the user equipment, and establishes an authentication rule to the second core network based on the identity information.

5. The method of claim 4, further comprising the second MEC platform notifying the first MEC platform to perform the user transition process to trigger the user equipment to perform a network selection.

6. The method of claim 5, further comprising the second core network receiving the service access request of the user equipment, identifying the access right, and establishing a session process of the user equipment based on the authentication rule.

7. A system for accessing private network services, the system being applicable to mobile edge computing (MEC) and comprising:
  a first MEC platform including a first authentication server, wherein a first core network includes the first MEC platform; and
  a second MEC platform including a second authentication server, wherein a second core network includes the second MEC platform,
  wherein the second authentication server receives a user service authentication process triggered by the first authentication server based on a service access request issued by user equipment for accessing the second core network,
  wherein in response to the user service authentication process, the second MEC platform preforms a user transition process to trigger the user equipment to perform an access authentication process of the second core network through the first authentication server to verify identity information and radio network information of the user equipment,
  wherein when the second MEC platform successfully verifies the identity information and the radio network information of the user equipment, the user equipment is allowed to be transited from the first MEC platform to the second MEC platform to access services of the second core network, and
  wherein the first MEC platform includes a first identity identification controller and a first radio network information controller, the first identity identification controller obtains the identity information and a user right from the first core network and provides to the first authentication server, the first radio network information controller obtains the radio network information from the first core network and provides to the first authentication server, the first MEC platform provides the radio network information to the second MEC platform for determining triggering the user transition process and allowing a second radio network information controller to compare radio signals.

8. The system of claim 7, wherein the first MEC platform includes a first registration controller, the second MEC platform includes a second registration controller, the second registration controller transmits an image file of an application to the first registration controller, an address stored the application, and an authentication protocol for executing the user service authentication process to launch the application in a first MEC system, the authentication protocol includes an identity of the second MEC platform, and the first MEC system comprises the first MEC platform.

9. The system of claim 8, wherein the user equipment issues the service access request through the application, and the application triggers the access authentication process through the first authentication server.

10. The system of claim 7, wherein the first MEC platform includes a first neighbor management controller, the second MEC platform includes a second neighbor management controller, and the first authentication server and the second authentication server perform the access authentication process through help of the first neighbor management controller and the second neighbor management controller.

11. The system of claim 7, wherein the second MEC platform includes a second identity identification controller and the second radio network information controller, the user transition process includes the second MEC platform receiving the identity information, the user right and the radio network information of the user equipment obtained by the first MEC platform, when the second MEC platform successfully verifies the identity information and the user right of the user equipment, the identity information of the user equipment is established in an access right of the second core network and stored in the second identity identification controller, and the user equipment is allowed to access services of the second core network by user radio access states obtained by the first radio network information controller and the second radio network information controller.

12. The system of claim 7, wherein the second MEC platform includes a second access right management controller, updates the access right of the user equipment to the second core network based on the identity information and the radio network information of the user equipment, and establishes an authentication rule in the second core network based on the identity information.

13. The system of claim 8, wherein the second MEC platform notifies the first MEC platform to perform the user transition process, and the first authentication server notifies the application to trigger the user equipment to perform a network selection.

14. The system of claim 12, wherein the second core network receives the service access request of the user equipment, identifies the access right, and establishes a session process of the user equipment based on the authentication rule.

* * * * *